(12) United States Patent
Zhai et al.

(10) Patent No.: US 11,312,054 B2
(45) Date of Patent: Apr. 26, 2022

(54) AUTOMATIC CLEANING METHOD FOR POWDER COATING PRODUCTION LINE

(71) Applicant: TIGER NEW SURFACE MATERIALS (SUZHOU) CO., LTD., Suzhou (CN)

(72) Inventors: Chunqin Zhai, Suzhou (CN); Zhenyu Mi, Suzhou (CN)

(73) Assignee: TIGER NEW SURFACE MATERIALS (SUZHOU) CO., LTD., Taicang (CN)

( * ) Notice: Subject to any disclaimer, the term of this patent is extended or adjusted under 35 U.S.C. 154(b) by 248 days.

(21) Appl. No.: 16/351,494

(22) Filed: Mar. 12, 2019

(65) Prior Publication Data
US 2019/0217519 A1 Jul. 18, 2019

Related U.S. Application Data

(63) Continuation-in-part of application No. PCT/CN2017/101324, filed on Sep. 12, 2017.

(30) Foreign Application Priority Data

Sep. 13, 2016 (CN) .......................... 201610818463.8

(51) Int. Cl.
*B08B 5/02* (2006.01)
*B29C 48/27* (2019.01)
(Continued)

(52) U.S. Cl.
CPC .............. *B29C 48/27* (2019.02); *B02C 23/18* (2013.01); *B04C 5/22* (2013.01); *B07B 1/55* (2013.01); *B08B 5/02* (2013.01)

(58) Field of Classification Search
CPC ........... B29C 48/27; B07B 1/55; B02C 23/18; B08B 5/02; B04C 5/22
See application file for complete search history.

(56) References Cited

U.S. PATENT DOCUMENTS 6,514,922 B2 * 2/2003 Waldrop .............. C11D 3/3749
510/188
6,530,382 B2 * 3/2003 Waldrop .............. C11D 3/3749
134/22.1
(Continued)

FOREIGN PATENT DOCUMENTS

CN 206083290 U * 4/2017

OTHER PUBLICATIONS

Translation of CN 206083290. (Year: 2021).*

*Primary Examiner* — Alexander Markoff
(74) *Attorney, Agent, or Firm* — Matthias Scholl P.C.; Matthias Scholl

(57) ABSTRACT

A method of cleaning a powder coating production line, the method including: providing a powder coating production line including equipment, an automatic cleaning tool, and a monitoring device; receiving, by the equipment, an instruction of automatic cleaning, and allowing the equipment to enter an automatic cleaning mode; cleaning, by the automatic cleaning tool, the equipment of the powder coating production line; monitoring, according to a preset monitoring condition and by the monitoring device, whether the automatic cleaning is completed; stopping the automatic cleaning when the monitoring device indicates the automatic cleaning has been completed, or continuing the automatic cleaning of the equipment; and turning off the automatic cleaning mode of the equipment.

7 Claims, 10 Drawing Sheets

(51) Int. Cl.
  *B07B 1/55*   (2006.01)
  *B02C 23/18*  (2006.01)
  *B04C 5/22*   (2006.01)

(56) References Cited

U.S. PATENT DOCUMENTS

| | | | | |
|---|---|---|---|---|
| 2006/0173098 A1* | 8/2006 | Tsujimoto | ................ | C08J 3/203 |
| | | | | 523/205 |
| 2013/0094912 A1* | 4/2013 | Mauchle | ................ | B65G 53/16 |
| | | | | 406/122 |
| 2013/0108379 A1* | 5/2013 | Mauchle | ................ | B05B 14/45 |
| | | | | 406/110 |
| 2014/0248095 A1* | 9/2014 | Michael | ................ | B05B 12/081 |
| | | | | 406/46 |
| 2019/0070620 A1* | 3/2019 | Altin | .................... | B05B 7/1454 |
| 2020/0139389 A1* | 5/2020 | Altin | .................... | B05B 7/1477 |

\* cited by examiner

AUTOMATIC CLEANING METHOD FOR POWDER COATING PRODUCTION LINE

CROSS-REFERENCE TO RELAYED APPLICATIONS

This application is a continuation-in-part of International Patent Application No. PCT/CN2017/101324 with an international filing date of Sep. 12, 2017, designating the United States, now pending, and further claims foreign priority benefits to Chinese Patent Application No. 201610818463.8 filed Sep. 13, 2016. The contents of all of the aforementioned applications, comprising any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of powder coating manufacturing, and more particularly to an automatic cleaning method for a powder coating production line.

In the powder coating industry, the equipment on the powder coating production line is often cleaned manually. The cleaning methods include water washing and blow cleaning, both of which are time-consuming and labor-consuming. In addition, the water cleaning method leads to high humidity inside the equipment and pipelines, adversely affecting the quality of the powder coatings, corroding the equipment, and reducing the service life of the equipment. The blow cleaning tends to produce copious amounts of dust, adversely affecting the working environment, and posing an explosion risk.

SUMMARY

The disclosure provides an automatic cleaning method for a powder coating production line. The method is adapted to eliminate the risks associated with manual cleaning, save the cleaning time, reduce equipment damage, and prolong the service life of the equipment; and meanwhile, the cleaning process may be monitored on-line. This ensures the efficiency of the automatic cleaning.

Disclosed is a method of automatically cleaning a powder coating production line, the method comprising:
a) providing a powder coating production line comprising equipment, an automatic cleaning tool, and a monitoring device; receiving, by the equipment, an instruction of automatic cleaning, and allowing the equipment to enter an automatic cleaning mode;
b) cleaning, by the automatic cleaning tool, the equipment of the powder coating production line;
c) monitoring, according to a preset monitoring condition and by the monitoring device, whether b) is completed; the preset monitoring condition comprising a cleaning time, a dust concentration, an electronic photo, and an electronic control parameter of the equipment;
d) stopping the automatic cleaning when the monitoring device indicates b) has been completed, or repeating b) and c); and
e) turning off the automatic cleaning mode of the equipment.

The equipment comprises a first device and a second device; the automatic cleaning tool comprises a first automatic cleaning tool adapted to clean the first device of the powder coating production line, and a second automatic cleaning tool adapted to clean the second device of the powder coating production line; the first automatic cleaning tool comprises a cleaning agent, and the second automatic cleaning tool comprises an automatic blowing device; and the first device comprises a feeding machine and an extruder, and the second device comprises a tablet machine, a mill, a cyclone separator, a sieve, and/or a negative pressure pipeline.

The extruder is cleaned as follows:
a10) receiving, by the extruder, an instruction of automatic cleaning, allowing the extruder to enter an automatic cleaning mode;
b10) feeding, by the feeding machine disposed on the extruder, the cleaning agent to the extruder, and automatically cleaning the extruder by the cleaning agent;
c10) monitoring, according to the preset monitoring condition of the extruder and by the monitoring device, whether b10) is completed; the preset monitoring condition comprising a cleaning time, a dust concentration, an electronic photo, and an electronic control parameter of the extruder;
d10) stopping the automatic cleaning of the extruder when the monitoring device indicates b10) has been completed, or repeating b10) and c10); and
e10) terminating the work of the extruder, and turning off the automatic cleaning mode.

The preset monitoring condition of the extruder can comprise a current and/or torque and/or rotational speed of the extruder.

Preferably, the second device of the powder coating production line is cleaned as follows:
a20) receiving, by the second device of the powder coating production line, an instruction of automatic cleaning, and allowing the second device to enter an automatic cleaning mode;
b20) blowing, by the automatic blowing device, the second device of the powder coating production line, and removing dust of the second device by a suction fan connected to the powder coating production line;
c20) monitoring, according to the preset monitoring condition of the second device and by the monitoring device, whether b20) is completed; the preset monitoring condition of the second device comprising a cleaning time, a dust concentration, an electronic photo, and an electronic control parameter of the second device;
d20) stopping blowing the second device when the monitoring device indicates b20) has been completed, or repeating b20) and c20); and
e20) turning off the automatic cleaning mode.

The preset monitoring condition can further comprise the blowing time of the automatic blowing device; when the monitoring result of the monitoring device shows the blowing time is satisfied, it is determined that b20) is completed.

The disclosure also provides a powder coating production line comprising a first device; a second device; an automatic cleaning tool; and at least one monitoring device. The automatic cleaning tool comprises a first automatic cleaning tool adapted to clean the first device of the powder coating production line, and a second automatic cleaning tool adapted to clean the second device of the powder coating production line. The first automatic cleaning tool comprises a cleaning agent; the second automatic cleaning tool comprises at least one automatic blowing device; the first device comprises a feeding machine and an extruder, and the second device comprises a tablet machine, a mill, a cyclone separator, a sieve, and/or a negative pressure pipeline; the at least one automatic blowing device is disposed in the extruder, the tablet machine, the mill, the cyclone separator, the sieve, and/or the negative pressure pipeline; the at least one monitoring device is disposed in the extruder, the tablet machine, the mill, the cyclone separator, the sieve, and/or the negative pressure pipeline; the feeding machine is connected to an input end of the extruder, and an output end of the extruder is coupled to the tablet machine; the tablet machine, the mill, the cyclone separator, and the sieve are connected sequentially via the negative pressure pipeline; the negative pressure pipeline is connected to a suction fan.

The tablet machine can comprise a cooling roller and a cooling belt connected to the cooling roller.

The tablet machine can comprise an automatic blowing device comprising a cylinder and a sliding block arranged on the cylinder; the cylinder can be fixed at a joint of the cooling roller and the cooling belt; the sliding block can be provided with a blowing nozzle.

The moving range of the cylinder can correspond to the length of the cooling roller.

The mill can comprise a feed port, a disc, a cooling chamber and a separating fan; the at least one automatic blowing device can be disposed in feed port, the disc, the cooling chamber and the separating fan.

This disclosure provides an automatic cleaning method and an improved powder coating production line. The method employs an automatic cleaning tool to clean the powder coating production line and employ a monitoring device to monitor the automatic cleaning process according to the preset monitoring conditions; once the cleaning process is completed, the automatic mode is closed. The method eliminates the hidden risks in the process of manual cleaning, saves the cleaning time, causes no damage to the equipment of the powder coating production line, and prolongs the service life of the equipment; and meanwhile, the operation of the cleaning process is on-line monitored. This ensures the efficiency of the automatic cleaning.

DETAILED DESCRIPTION

This disclosure provides an automatic cleaning method for a powder coating production line.

This disclosure also provides an improved powder coating production line, which can be cleaned using the above automatic cleaning method.

Figure 1:
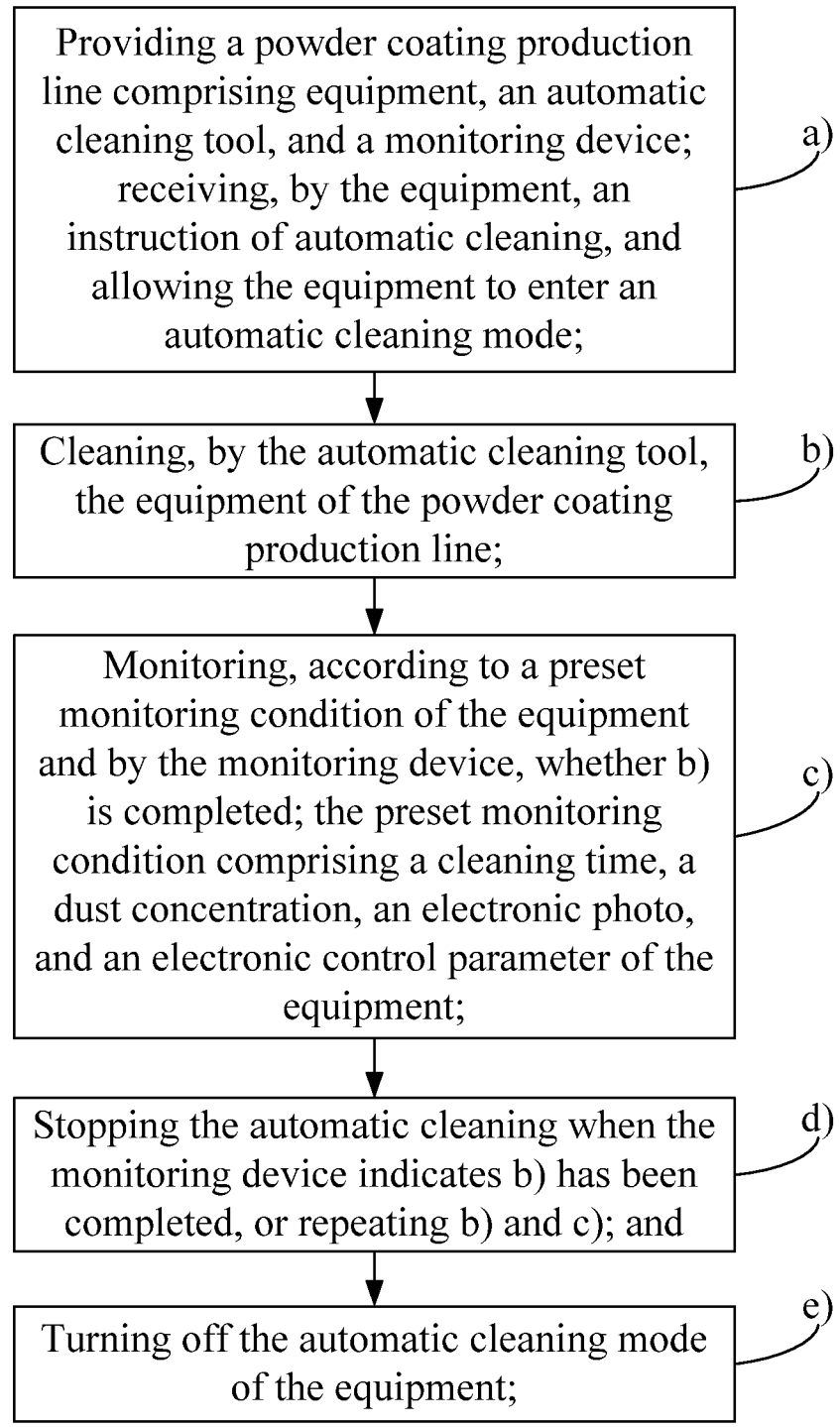
FIG. 1 is a flow chart of a method of automatically cleaning a powder coating production line according to one embodiment of the disclosure.

As shown in FIG. 1, provided is an automatic cleaning method of a powder coating production line, the method comprising:

a) providing a powder coating production line comprising equipment, an automatic cleaning tool, and a monitoring device; receiving, by the equipment, an instruction of automatic cleaning, and allowing the equipment to enter an automatic cleaning mode;

b) cleaning, by the automatic cleaning tool, the equipment of the powder coating production line;

c) monitoring, according to a preset monitoring condition of the equipment and by the monitoring device, whether b) is completed; the preset monitoring condition comprising a cleaning time, a dust concentration, an electronic photo, and an electronic control parameter of the equipment;

d) stopping the automatic cleaning when the monitoring device indicates b) has been completed, or repeating b) and c); and e) turning off the automatic cleaning mode of the equipment.

In certain embodiments of the disclosure, the equipment comprises a first device and a second device. The automatic cleaning tool comprises a first automatic cleaning tool adapted to clean the first device of the powder coating production line, and a second automatic cleaning tool adapted to clean the second device of the powder coating production line; the first automatic cleaning tool comprises a cleaning agent, and the second automatic cleaning tool comprises an automatic blowing device. Specifically, the first device comprises a feeding machine and an extruder, and the second device comprises a tablet machine, a mill, a cyclone separator, a sieve, and/or a negative pressure pipeline. Preferably, the second device comprises a tablet machine, a mill, a cyclone separator, a screen, and a negative pressure pipeline, so that the powder coating production line can be cleaned completely. Optionally, in other implementations, technicians in the field can select or combine a method of cleaning the extruder, a method of cleaning the tablet machine, a method of cleaning the mill, a method of cleaning the cyclone separator, a method of cleaning the screen, and a method of cleaning the negative pressure pipeline. The cleaning methods in single or combination modes are all under the protection of the disclosure.

Figure 2:
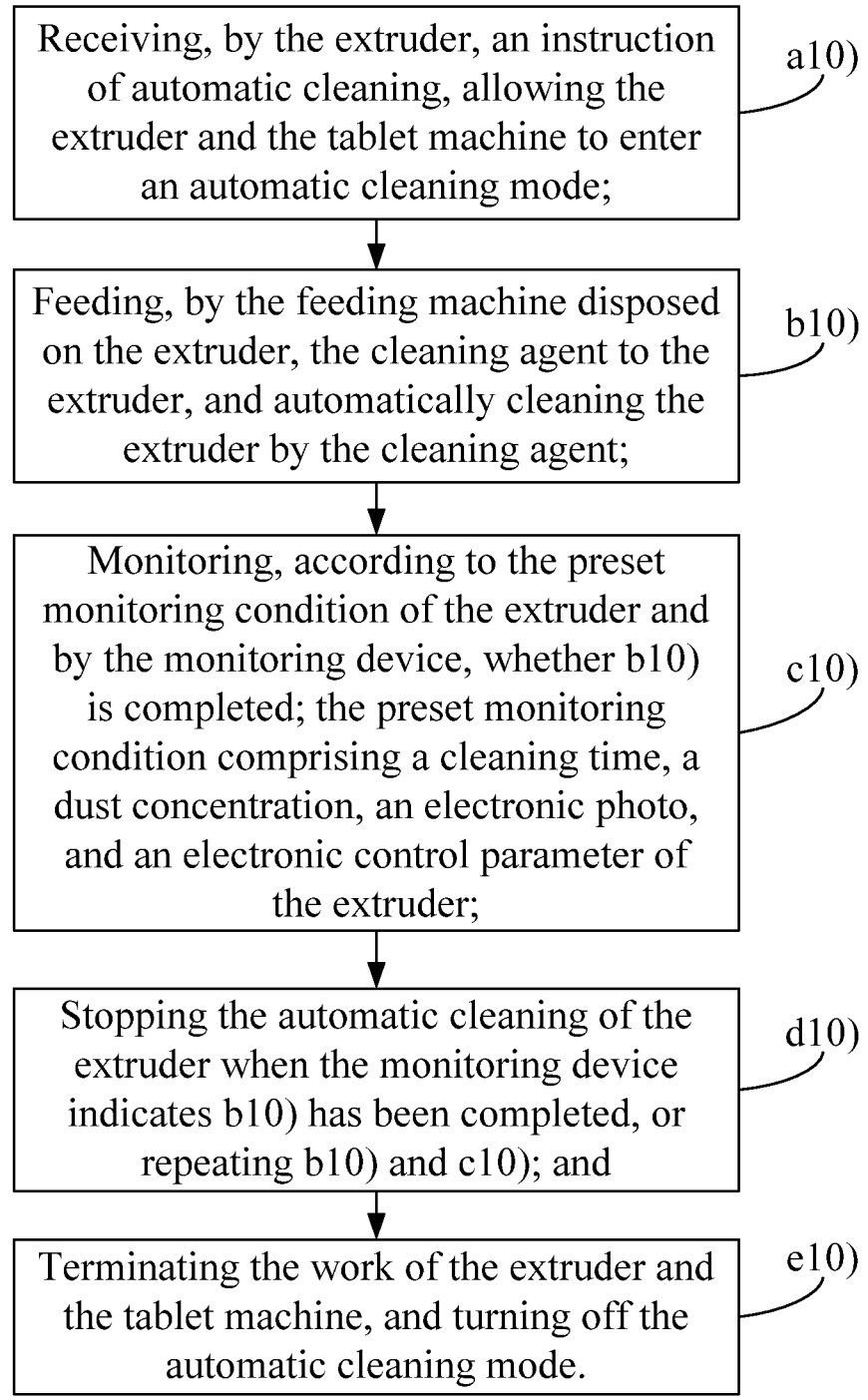
FIG. 2 is a method of cleaning an extruder of a powder coating production line according to one embodiment of the disclosure.

As shown in FIG. 2, in certain embodiments of the disclosure, the extruder is cleaned as follows:

a10) receiving, by the extruder, an instruction of automatic cleaning, allowing the extruder to enter an automatic cleaning mode;

b10) feeding, by a feeding machine disposed on the extruder, the cleaning agent to the extruder, and automatically cleaning the extruder by the cleaning agent;

c10) monitoring, according to a preset monitoring condition and by a monitoring device, whether b10) is completed; preferably, the preset monitoring condition comprises a monitoring parameter with regard to the extruder and the feeding machine; when the monitoring result of the monitoring device conforms to the monitoring parameter, it is determined that b10) is completed; the monitoring parameter comprises current and/or torque and/or rotational speed of the extruder and the feeding machine; specifically, the monitoring parameter comprises the current and torque of the extruder;

d10) stopping the automatic cleaning of the extruder when the monitoring device indicates b10) has been completed, or repeating b10) and c10); and e10) terminating the work of the extruder, and turning off the automatic cleaning mode.

Figure 3:
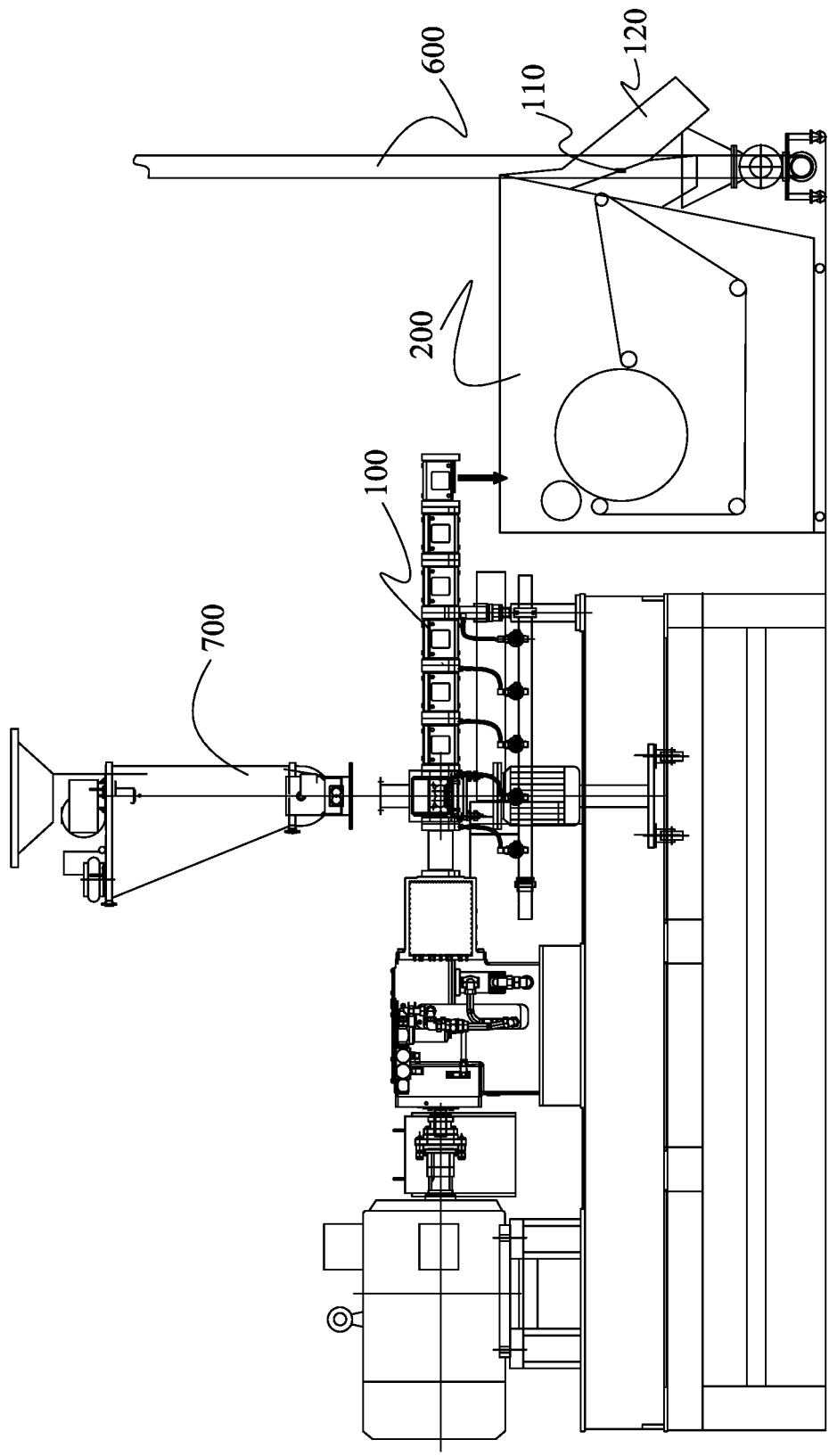
FIG. 3 is a structure diagram of an extruder of a powder coating production line according to one embodiment of the disclosure.

FIG. 3 shows a structure diagram of an extruder in the being automatically cleaned state. The feeding machine 700 is connected to the input end of the extruder 100, and the output end of the extruder is coupled to the tablet machine 200. Preferably, in this implementation, the cleaning agent is a mixture of resin and filler. A valve 110 is connected to the outlet of the extruder, and the other end of the valve 110 is connected to a collector 120 adapted to collect the cleaning waste, thus achieving the automatic collection of the cleaning waster, and improving the automatic cleaning of the extruder 100.

Figure 4:
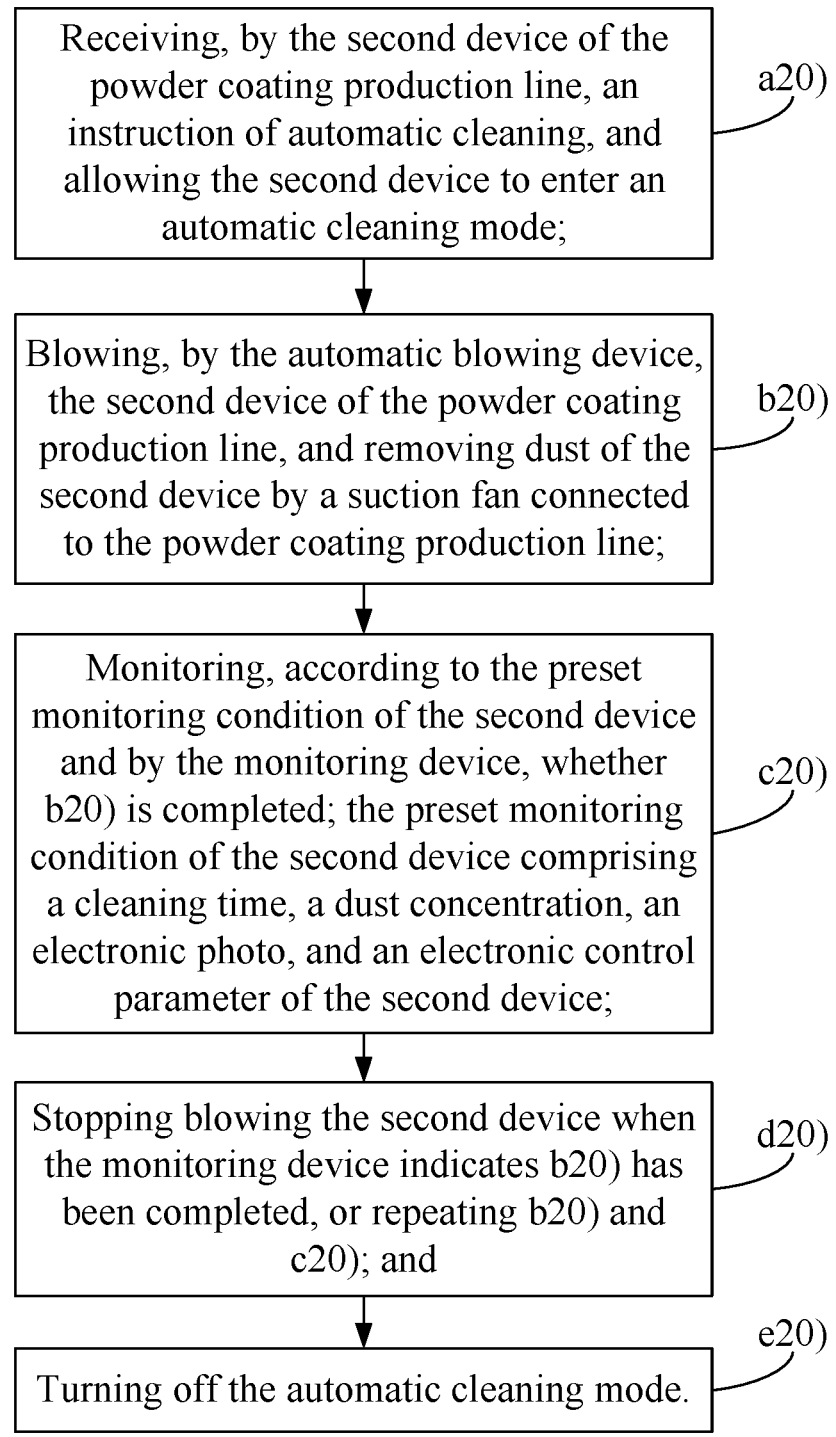
FIG. 4 is a method of cleaning a second device of the powder coating production line according to one embodiment of the disclosure.

As shown in FIG. 4, In certain embodiments of the disclosure, the second device of the powder coating production line is cleaned as follows:

a20) receiving, by the second device of the powder coating production line, an instruction of automatic cleaning, and allowing the second device to enter an automatic cleaning mode;

b20) blowing, by the automatic blowing device, the second device of the powder coating production line, and removing dust of the second device by a suction fan connected to the powder coating production line;

c20) monitoring, according to the preset monitoring condition of the second device and by the monitoring device, whether b20) is completed; the preset monitoring condition of the second device comprising a cleaning time, a dust concentration, an electronic photo, a blowing time, and an electronic control parameter of the second device; specifically, the preset monitoring condition comprises the blowing time of the automatic blowing device; when the monitoring result of the monitoring device shows the blowing time is satisfied, it is determined that b20) is completed;

d20) stopping blowing the second device when the monitoring device indicates b20) has been completed, or repeating b20) and c20); and e20) turning off the automatic cleaning mode.

Also provided is an improved powder coating production line which can be automatically cleaned according to the aforesaid method.

As shown in FIG. 3 and FIGS. 5-10, an improved powder coating production line is provided. The equipment comprises an extruder 100, a tablet machine 200, a mill 300, a cyclone separator 400, a sieve 500, a negative pressure pipeline 600. The input end of the extruder 100 is provided with a feeding machine 700, and the output end of the extruder is coupled to the tablet machine 200. The tablet machine 200, the mill 300, the cyclone separator 400, and the sieve 500 are connected sequentially via the negative pressure pipeline 600. The negative pressure pipeline 600 is connected to a suction fan (not shown in the figure). The tablet machine 200, the mill 300, the cyclone separator 400, the sieve 500 and the negative pressure pipeline 600 each are provided with one or more automatic blowing devices. All the automatic blowing devices are connected to a control device. The control device is adapted to control the automatic blowing device to automatically start or stop the blowing operation. Specifically, in the implementation of the disclosure, the control device controls the automatic blowing device to clean the second device of the powder coating production line according to aforesaid method.

Figure 5:
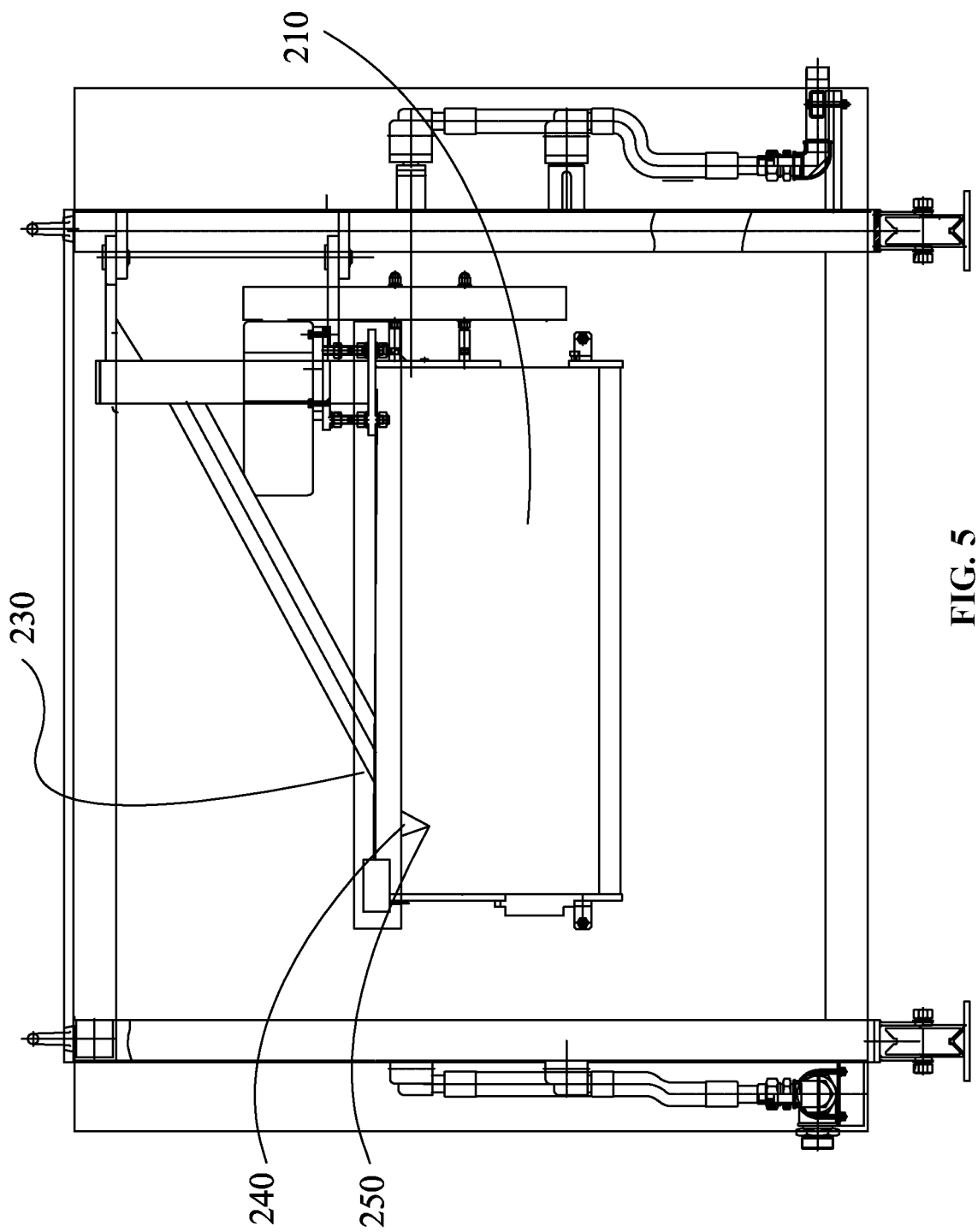
FIG. 5 is a front view of a tablet machine of a powder coating production line according to one embodiment of the disclosure.
Figure 6:
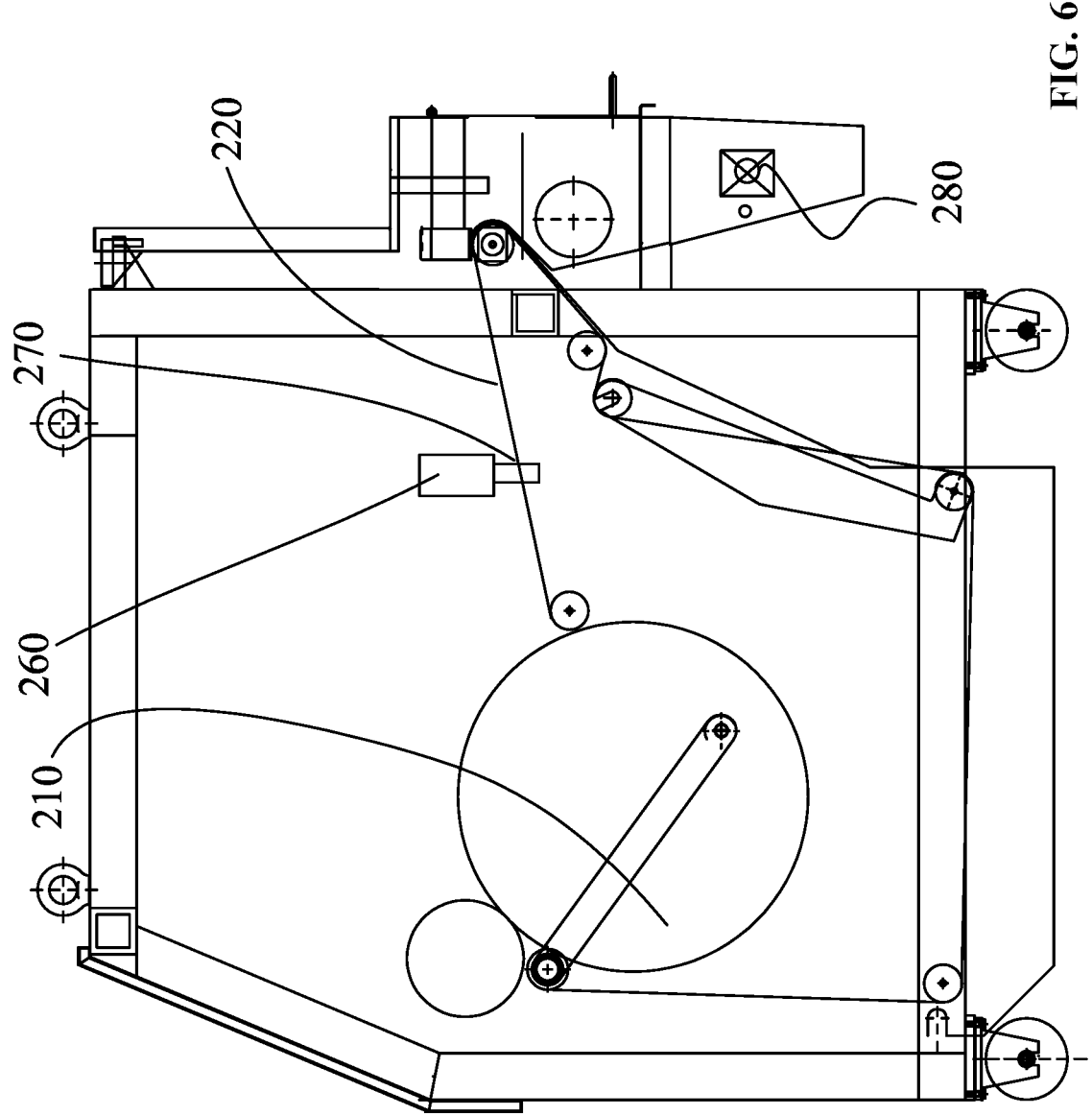
FIG. 6 is a side view of a tablet machine of a powder coating production line according to one embodiment of the disclosure.

As shown in FIG. 5, in one embodiment of the disclosure, the tablet machine 200 comprises a cooling roller 210 and a cooling belt 220 connected to the cooling roller (see FIG. 6). The tablet machine comprises an automatic blowing device comprising a cylinder 230 and a sliding block 240 arranged on the cylinder. The cylinder 230 is fixed at the joint of the cooling roller 210 and the cooling belt 220. A blowing nozzle 250 is fixed on the sliding block 240. Preferably, the moving range of the cylinder 230 corresponds to the length of the cooling roller 210. For example, the length is 1000 mm. The diameter of the blowing nozzle 250 is preferably 5 mm. When the automatic cleaning mode starts, the cylinder 230 is driven by the sliding block 240 to drive the blowing nozzle 250 to slide back and forth in the sliding rail of the cylinder 230 to ensure the automatic cleaning of the cooling roller 210 and the cooling belt 220. Further preferably, in this implementation, the tablet machine 200 comprise a rotary valve 280 (see FIG. 6) adapted to lifting the cleaning agent. The rotary valve is automatically opened and closed. When the tablet machine 200 is in an automatic cleaning mode, the valve element of the rotary valve 280 is automatically withdrawn, and a suction fan connected to the negative pressure pipe 600 starts to work, achieving the negative pressure dust collection for the tablet machine 200, avoiding safety risks of the tablet machine 200 caused by the dust diffusion in the automatic cleaning process; preferably, as shown in FIG. 6, the surface of the cooling belt 220 is provided with an automatic cleaning device. The automatic cleaning device comprises a cylinder 260 and a washing sponge 270 fixed on the cylinder. The cleaning sponge 270 is disposed between the cylinder 260 and the surface of the cooling belt 220.

Figure 7:
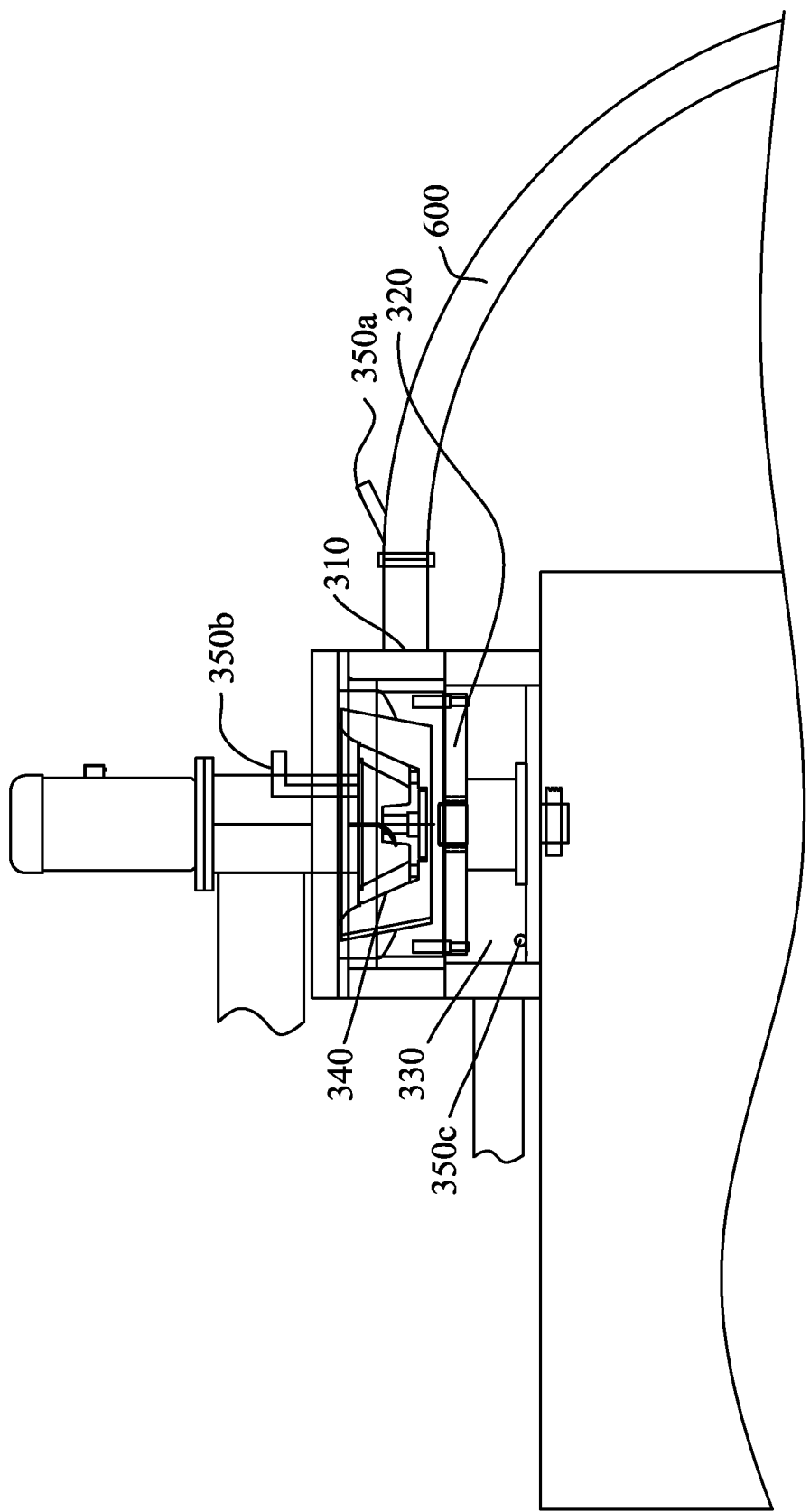
FIG. 7 is a structure diagram of a mill of a powder coating production line according to one embodiment of the disclosure.

As shown in FIG. 7, in one embodiment of the disclosure, the mill 300 comprises a feed port 310, a disc 320, a cooling chamber 330 and a separating fan 340. The automatic blowing devices 350a, 350b and 350c are installed on the feed port 310, the top of the separating fan 340 and the cooling chamber 330, respectively. When the mill 300 is in the automatic cleaning mode, the automatic blowing devices 350a, 350b, 350c sequentially clean the disc 320, the separating fan 340 and the cooling chamber 330, and meanwhile, the suction fan connected to the negative pressure pipeline 600 starts, so that no dust is diffused in the automatic cleaning process of the mill 300.

Figure 8:
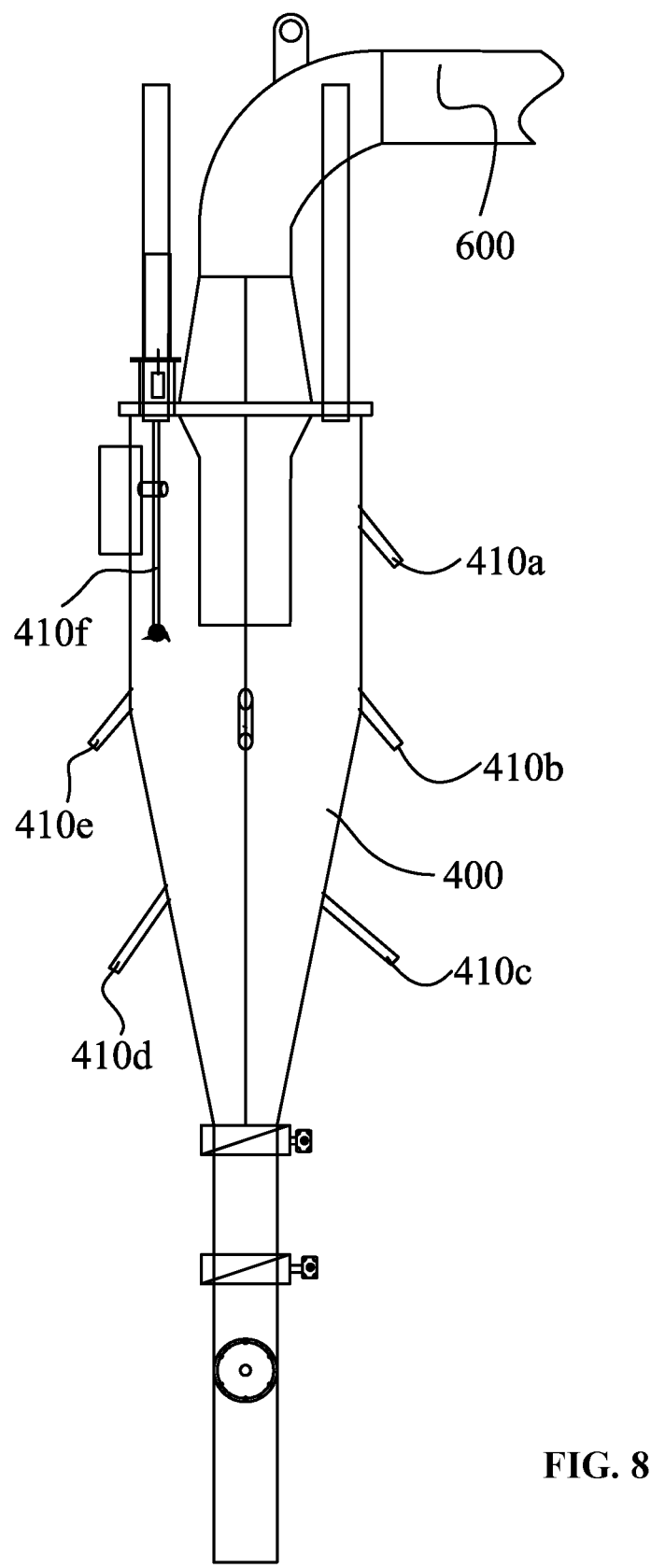
FIG. 8 is a structure diagram of a cyclone separator of a powder coating production line according to one embodiment of the disclosure.

As shown in FIG. 8, in one embodiment of the disclosure, the automatic blowing devices of the cyclone separator are of automatic rotary type and are installed in the chamber of the cyclone separator 400; the number of the automatic blowing devices can be 3-8, and are installed in different positions of the chamber of the cyclone separator 400. As shown in FIG. 8, six automatic blowing devices 410a, 410b, 410c, 410d, 410e and 410f of the cyclone separator are disposed; when the automatic cleaning mode of the cyclone separator 400 starts, the control device controls the automatic blowing devices 410a, 410b, 410c, 410d, 410e and 410f on the chamber of the cyclone separator 400 to blow automatically, to achieve automatic cleaning. And meanwhile, the suction fan connected to the negative pressure pipe 600 starts to work, so that no dust is diffused in the automatic cleaning process of the cyclone separator 400.

Figure 9:
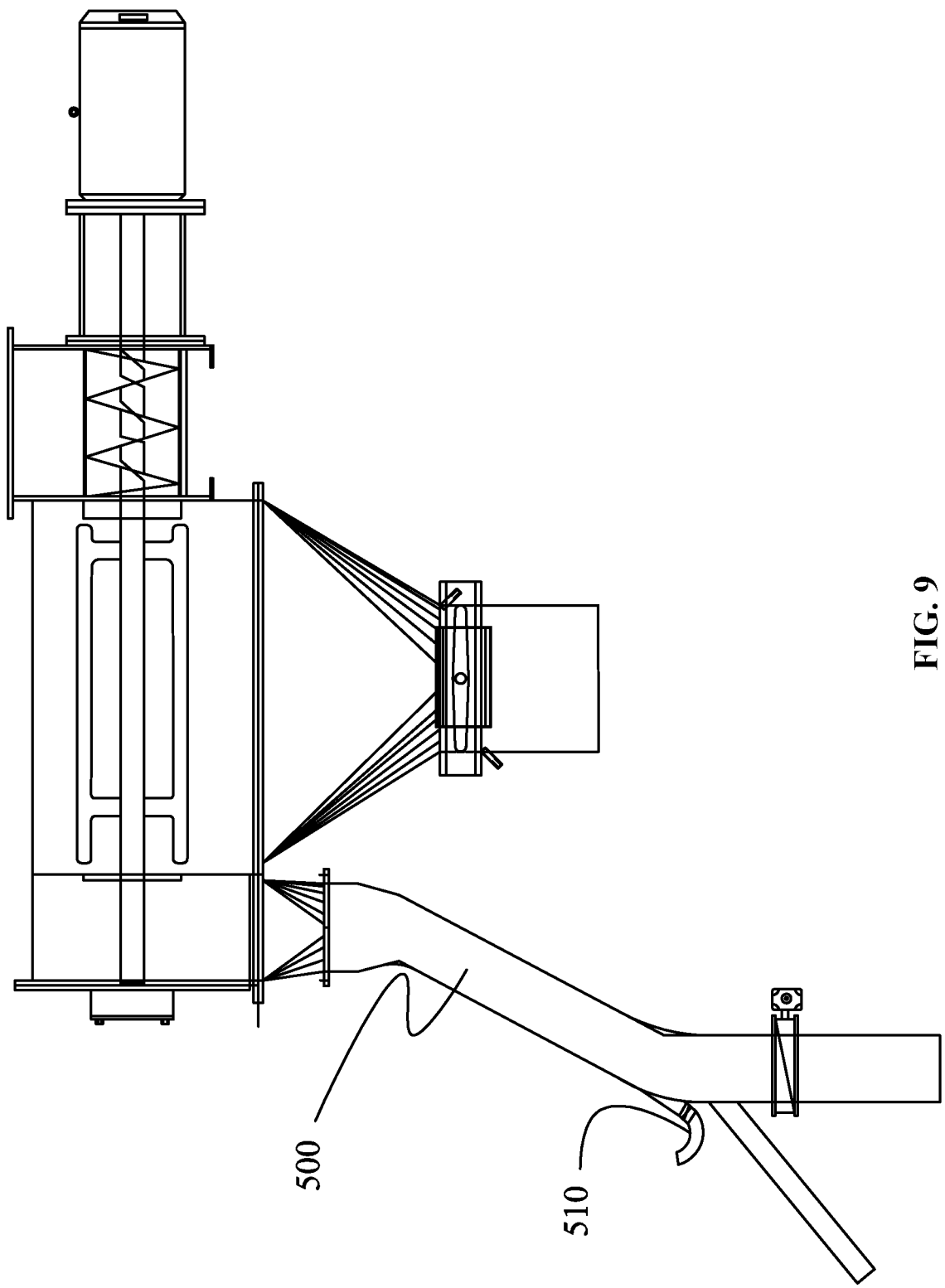
FIG. 9 is a structure diagram of a sieve of a powder coating production line according to one embodiment of the disclosure.

As shown in FIG. 9, in one embodiment of the disclosure, the sieve 500 comprises an automatic valve which facilitates the automatic powder delivery in the cleaning process of the sieve 500. The sieve 500 comprises an automatic blowing device 510 which is disposed in the sieve 500. When the sieve 500 is in the automatic cleaning mode, the control device controls the automatic blowing device 510 to blow air to the sieve 500, achieving the automatic cleaning of the sieve; and meanwhile, the suction fan connected to the negative pressure pipe 600 starts to work, so that t no dust is diffused in the automatic cleaning process of the sieve 500.

Figure 10:
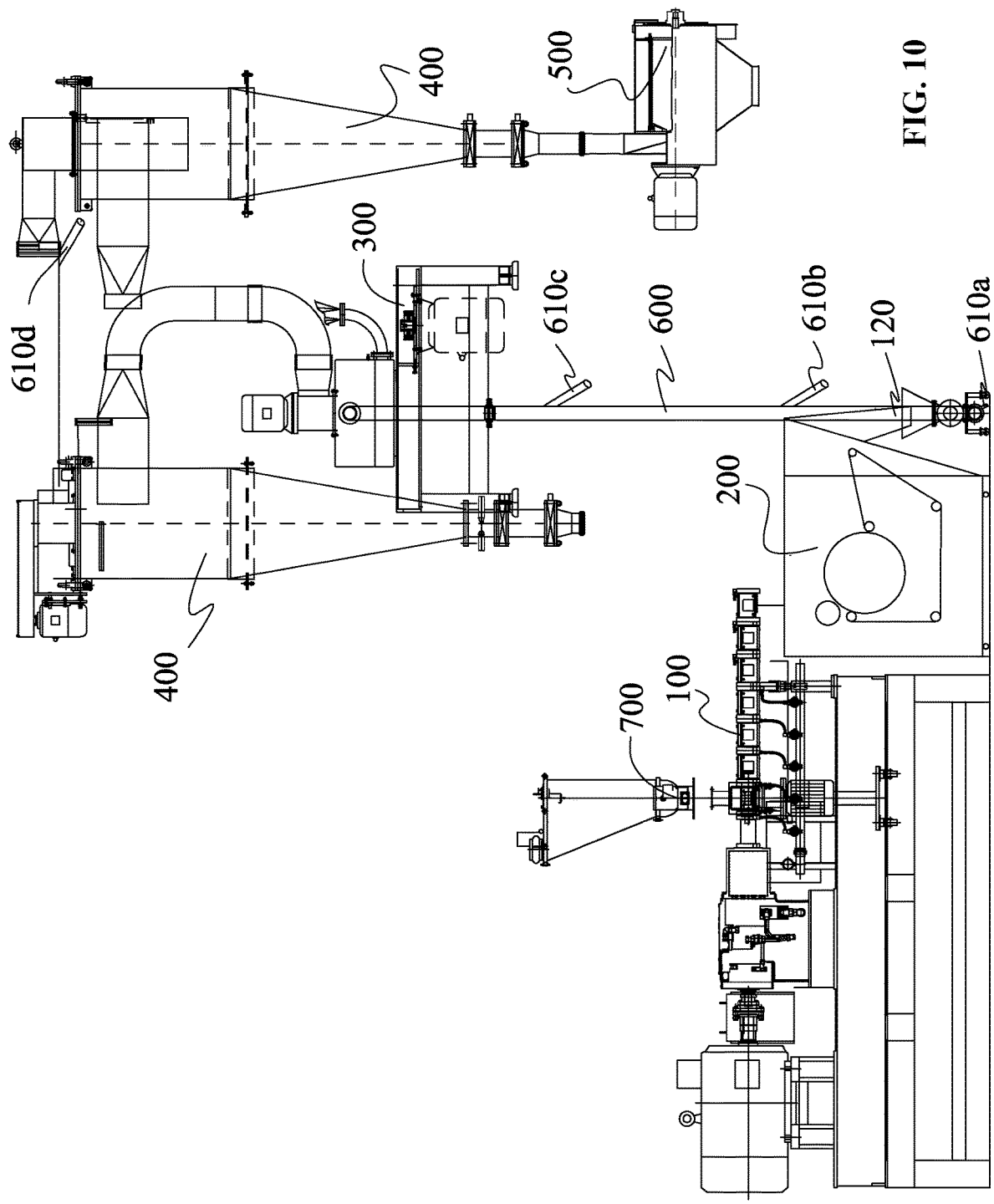
FIG. 10 is a structure diagram of a negative pressure pipeline of a powder coating production line according to one embodiment of the disclosure.

As shown in FIG. 10, in one embodiment of the disclosure, the negative pressure pipe comprises 3-10 automatic blowing devices 610 which are installed on the different parts of the negative pressure pipe 600, for example, the automatic blowing devices 610a, 610b, 610c and 610d; when the negative pressure pipe 600 is in the automatic cleaning mode, the control device controls the automatic blowing devices 610 of the negative pressure pipe to blow air to the negative pressure pipe 600 for automatic blowing. And meanwhile, the suction fan connected to the negative pressure pipe 600 starts to work, so that no dust is diffused in the automatic cleaning process of the negative pressure pipe 600.

In the process of automatic cleaning, a program can automatically control a plurality of strong blowing devices on the negative pressure pipeline, and clean the inner parts of the pipeline. During the cleaning process, the suction fan works continuously for dust removal, so that no dust is diffused.

The number and installation location of the automatic blowing devices in the specific embodiment is not limited by the disclosure. In other embodiments, the technical personnel in the field can select the number and installation location of the automatic blowing devices according to the specific needs to achieve better automatic cleaning effect.

This disclosure provides an automatic cleaning method for a powder coating production line. The method employs an automatic cleaning tool to clean the powder coating production line and employ a monitoring device to monitor the automatic cleaning according to the preset monitoring conditions; once the cleaning process is completed, automatic mode is turned off. The method is adapted to eliminate the hidden risks in the process of manual cleaning, save the cleaning time, cause no damage to the equipment of the powder coating production line, and prolong the service life of the equipment; and meanwhile, the operation of the cleaning method is on-line monitored. This ensures the efficiency of automatic cleaning.

It will be obvious to those skilled in the art that changes and modifications may be made, and therefore, the aim in the appended claims is to cover all such changes and modifications.

What is claimed is:

1. A method, comprising:
   a) providing a powder coating production line comprising equipment, an automatic cleaning tool, and a monitoring device; receiving, by the equipment, an instruction of automatic cleaning, and allowing the equipment to enter an automatic cleaning mode;
   b) cleaning, by the automatic cleaning tool, the equipment of the powder coating production line;
   c) monitoring, according to a preset monitoring condition of the equipment and by the monitoring device, whether b) is completed; d) stopping the automatic cleaning when the monitoring device indicates b) has been completed, or repeating b) and c); and
   e) turning off the automatic cleaning mode of the equipment;

wherein:
   the equipment comprises a first device and a second device; and
   the automatic cleaning tool comprises a first automatic cleaning tool adapted to clean the first device of the powder coating production line, and a second automatic cleaning tool adapted to clean the second device of the powder coating production line; the first automatic cleaning tool comprises a cleaning agent, and the second automatic cleaning tool comprises an automatic blowing device.

2. The method of claim 1, wherein the first device comprises a feeding machine and/or an extruder, and the second device comprises a tablet machine, a mill, a cyclone separator, a sieve, and/or a negative pressure pipeline.

3. The method of claim 1, wherein the preset monitoring condition comprises a cleaning time, a dust concentration, an electronic photo, and/or an electronic control parameter of the equipment.

4. The method of claim 2, wherein the extruder is cleaned as follows:
   a10) receiving, by the extruder, an instruction of automatic cleaning, allowing the extruder to enter an automatic cleaning mode;
   b10) feeding, by the feeding machine disposed on the extruder, the cleaning agent to the extruder, and automatically cleaning the extruder by the cleaning agent;
   c10) monitoring, according to the preset monitoring condition of the extruder and by the monitoring device, whether b10) is completed; the preset monitoring condition comprising a cleaning time, a dust concentration, an electronic photo, and/or an electronic control parameter of the extruder;
   d10) stopping the automatic cleaning of the extruder when the monitoring device indicates b10) has been completed, or repeating b10) and c10); and
   e10) terminating the work of the extruder, and turning off the automatic cleaning mode.

5. The method of claim 4, wherein the preset monitoring condition of the extruder comprises a current and/or torque and/or rotational speed of the extruder.

6. The method of claim 1, wherein the second device of the powder coating production line is cleaned as follows:
   a20) receiving, by the second device of the powder coating production line, an instruction of automatic cleaning, and allowing the second device to enter an automatic cleaning mode;
   b20) blowing, by the automatic blowing device, the second device of the powder coating production line, and removing dust of the second device by a suction fan connected to the powder coating production line;
   c20) monitoring, according to the preset monitoring condition of the second device and by the monitoring device, whether b20) is completed; the preset monitoring condition of the second device comprising a cleaning time, a dust concentration, an electronic photo, and/or an electronic control parameter of the second device;
   d20) stopping blowing the second device when the monitoring device indicates b20) has been completed, or repeating b20) and c20); and
   e20) turning off the automatic cleaning mode.

7. The method of claim 6, wherein the preset monitoring condition further comprises a blowing time of the automatic blowing device; when a monitoring result of the monitoring device shows the blowing time is satisfied, it is determined that b20) is completed.

* * * * *